(12) United States Patent  
Kusters

(10) Patent No.: US 6,344,019 B1  
(45) Date of Patent: Feb. 5, 2002

(54) CYLINDER DEVICE FOR PROCESSING CONTINUOUS MATERIAL STRIPS

(75) Inventor: Karl-Heinz Kusters, Krefeld (DE)

(73) Assignee: Eduard Kusyers Maschinenfabrik GmbH & Co. KG, Krefeld (DE)

( * ) Notice: Subject to any disclaimer, the term of this patent is extended or adjusted under 35 U.S.C. 154(b) by 0 days.

(21) Appl. No.: 09/367,527

(22) PCT Filed: Feb. 12, 1998

(86) PCT No.: PCT/DE98/00400

§ 371 Date: Nov. 4, 1999

§ 102(e) Date: Nov. 4, 1999

(87) PCT Pub. No.: WO98/36183

PCT Pub. Date: Aug. 20, 1998

(30) Foreign Application Priority Data

Feb. 14, 1997 (DE) .......................................... 197 05 638

(51) Int. Cl.⁷ ................................................ F16C 13/00
(52) U.S. Cl. ......................... 492/16; 492/7; 100/162 B
(58) Field of Search .............................. 492/16, 7, 47; 384/130, 481, 482, 140, 558; 100/162 B, 155 R, 176, 168, 170

(56) References Cited

U.S. PATENT DOCUMENTS

| | | | |
|---|---|---|---|
| 1,978,218 A | * 10/1934 | Nadler | 308/9 |
| 4,709,629 A | * 12/1987 | Appenzeller et al. | 100/162 B |
| 4,856,154 A | * 8/1989 | Nikulainen et al. | 29/113.1 |
| 4,991,499 A | * 2/1991 | Kusters | 100/47 |
| 4,995,147 A | * 2/1991 | Ahrweiler et al. | 29/116.1 |
| 5,061,087 A | * 10/1991 | Roerig et al. | 384/192 |
| 5,119,542 A | * 6/1992 | Kusters et al. | 29/116.2 |
| 5,140,731 A | * 8/1992 | Brendel | 29/116.2 |
| 5,158,030 A | * 10/1992 | DuBois et al. | 114/20.1 |
| 5,174,002 A | * 12/1992 | Kusters | 29/115 |
| 5,382,096 A | * 1/1995 | Stein et al. | 384/116 |
| 5,771,694 A | * 6/1998 | Houtman et al. | 60/517 |

FOREIGN PATENT DOCUMENTS

DE 86 08 228 * 8/1989

* cited by examiner

Primary Examiner—S. Thomas Hughes  
Assistant Examiner—Marc W. Butler  
(74) Attorney, Agent, or Firm—Kenyon & Kenyon

(57) ABSTRACT

A cylinder device includes a deflection-controllable cylinder having a rotating hollow cylinder which is longitudinally traversed by a crosshead. Crosshead sags when subjected to a load. The ends of the crosshead, which protrude from the hollow cylinder, are supported by bearings in the cylinder housing that include flat slide surfaces which interact, are hydraulically relieved of load, and absorb the elongation of the crosshead. Also, where applicable, spherical surfaces which interact, are hydraulically relieved of load, and absorb the deflection of the crosshead.

22 Claims, 5 Drawing Sheets

CYLINDER DEVICE FOR PROCESSING CONTINUOUS MATERIAL STRIPS

BACKGROUND OF THE INVENTION

The invention relates to a rolling contact cylinder device for subjecting webs to a pressure treatment. The device has a deflection-controllable cylinder that includes a hollow cylinder rotating around its axis and forming the working cylinder circumference. It is traversed lengthwise by a non-rotatable crosshead, clearance being maintained between the crosshead around the entire inner circumference of the hollow cylinder, and having an inner support device which is mounted on the crosshead and which acts on the inner circumference of the hollow cylinder. Outer bearings are provided, which support the ends of the crosshead at outer sidewalls and which have cooperating spherical surfaces for absorbing the deflection of the crosshead, one of which is attached to the crosshead and the other to the respective sidewall. The parts of the bearing in question are combined within a ring-shaped bearing element arranged in a plane that is perpendicular to the axis of the crosshead and the bearing element being arranged in an opening in the sidewall.

A cylinder device of this kind is described in U.S. Pat. No. 4,856,154. Here, the inner support device includes a series of support plungers, having hydrostatic bearing pockets, mounted on the crosshead along the cylinder gap which act on the inner circumference of the hollow cylinder on the cylinder gap side and apply the necessary individual forces there so as to generate the line force. When subjected to the opposite forces of the support plungers, the crosshead sags within the hollow cylinder without touching its inner circumference. For this reason, separation is maintained between the crosshead and this inner circumference all around. The alignment of the hollow cylinder is not affected or is only slightly affected by the line force in the cylinder gap. The sagging crosshead, which is subject to a line load due to the line force and is supported at its ends, provides the deformation required to apply counterload to the line load along the cylinder gap.

The type of support device used is independent of the invention. In the case of the cylinder device per U.S. Pat. No. 4,856,154, the support device includes the aforementioned plungers. However, it is also possible to use a longitudinal chamber in the shape of a semicylindrical pan filled with hydraulic fluid as described in German Patent No. PS 10 26 609. Magnetic or mechanical support devices are also feasible.

In all instances, the crosshead sags as described above, and as a result the ends of the crosshead that protrude from the hollow cylinder become inclined. In the known embodiment, these ends are supported in static outer bearings which are generally arranged in the sidewalls of a cylinder housing or in calender rockers and have spherical parts to prevent jamming which allow the crosshead to sag and transfer the cylinder forces to the machine housing.

The load applied to an individual pair of spherical parts at one end of the crosshead on the order of magnitude of 100 t. As the degree of deflection of the crosshead changes, the position of the spherical parts relative to one another changes due to the substantial load and the corresponding friction, and as a result substantial tilting forces are transferred from the bearing to the machine housing. It is therefore very important that a static bearing be used in which a given bearing does not turn relative to its counterpart during operation, but rather merely shifts slightly towards its counterpart in the plane of action when a change in deflection occurs. In this case the friction problem is particularly severe, as the break-away moment must be overcome.

U.S. Pat. No. 4,856,154 also makes reference to the space limitations to which the cylinders in question are subject: The bearing at the end of the crosshead must not project beyond the diameter of the hollow cylinder, otherwise it will come into conflict with the bearing of the adjacent cylinder. Therefore any embodiment of a cylinder of this kind must be designed so that it is radially as compact as possible.

In the case of the embodiment per German Auslegeschrift No. As 22 54 392, which is in other respects similar to U.S. Pat. No. 4,856,154, the friction is limited to the spherical parts, as movement only occurs there. This embodiment has inner throw, i.e. the hollow cylinder as a whole can move in a transverse direction relative to the crosshead. Cylinder adjustment movements are carried out by the inner support device, i.e. inside the cylinder. The bearings on the ends of the crosshead only have to absorb the deflection-related changes in angle, and do not have to be shifted as a whole in the plane of action when adjustment movements are carried out.

Bearing-centered cylinders are also used, and have rotatable bearings at the ends of the hollow cylinder via which the crosshead is supported. In this case the crosshead cannot move in a transverse direction relative to the crosshead, and therefore adjustment movements cannot be made inside the cylinder itself; instead, the cylinder as a whole must be shifted, along with its crosshead. In the case of these cylinders, adjustment movements are carried out by plunger/cylinder units which act on the end of the crosshead, are arranged in the cylinder housing, and act on the ends of the crosshead. The ends of the crosshead move along guideways which are parallel to the plane of action of the cylinder or in the cylinder housing. Due to the substantial amount of friction on the spherical parts that are also present in this case, load is applied to the guideways and results in frictional forces that make it difficult to precisely control the line force in the cylinder gap. The spherical surfaces in the bearings of the crosshead are used to absorb the alignment errors of the end of the crosshead that occur when the crosshead sags. Particularly in the case of tempered cylinders, the crosshead, which may be as much as 10 meters in length, undergoes thermal-related changes in length that cause the crosshead to shift in its longitudinal direction relative to the sidewalls of the cylinder housing, which are unaffected by the thermal elongation. Particularly in the case of heated cylinders, in which the crosshead also increases in temperature in its stationary state, the ends of the cylinders can shift by a significant amount. In the case of a 10-meter-long cylinder, a temperature difference of 100 degrees [C] can result in a shift of more than one centimeter, which must be absorbed by the outer bearings, and in this respect friction also arises at full load.

There remains a need therefore, in the case of a cylinder of the type described, to eliminate the problems associated with the high level of friction on the outer bearings while preserving the desired radially compact design.

SUMMARY OF THE INVENTION

The present invention provides for a cylinder device for processing continuous material strips having a deflection-controllable cylinder that includes a hollow cylinder rotating around its axis and which forms the working cylinder circumference. It is traversed lengthwise by a non-rotatable crosshead, clearance being maintained between the crosshead around the entire inner circumference of the hollow cylinder, and has an inner support device which is mounted on the crosshead and which acts on the inner circumference of the hollow cylinder. It also has outer bearings, which support the ends of the crosshead at outer sidewalls and which have cooperating spherical surfaces for absorbing the deflection of the crosshead, one of which is attached to the crosshead and the other to the respective sidewall. The parts of the bearing in question are combined within a ring-shaped bearing element arranged in a plane that is perpendicular to the axis of the crosshead and the bearing element is arranged in an opening in the sidewall. The given end of the crosshead extends through the ring-shaped bearing element and has a shoulder in the area of the bearing element that supports the single constructional unit formed by the components of the bearing. To compensate for thermal-related changes in the length of the crosshead, an arrangement of flat slide surfaces that are hydrostatically relieved of load is provided, one of which is joined to the crosshead and the other to the sidewall. The spherical surfaces and the flat slide surfaces or faces are at least to some extent hydraulically relieved of load.

Further space-saving is achieved if the shoulder of the crosshead is provided; the shoulder creates space for the the components that transfer load.

To compensate for the thermal-related changes in length, flat slide surfaces that absorb these changes in length are provided. According to the present invention the flat slide surfaces and the spherical surfaces are at least to some extent hydraulically relieved of load.

In this case, that the outer bearings "are at least to some extent hydraulically freed of load" means that at least most of the load acting on the bearing surfaces is transferred through a hydraulic fluid, so that when mutual shifting of interacting surfaces occurs most of the load is carried away via the fluid, i.e. in a virtually friction-free manner, so that to this extent the friction which would otherwise be generated on the bearing surfaces and any resulting moments that would act on the guide elements are eliminated.

The bearing parts are combined to form a unit that can be arranged in an opening in the sidewall, i.e. the sidewall of the cylinder housing. As a result, one can manufacture an embodiment that saves a great deal of space, because no components such as hydraulic cylinders or the like for carrying out adjustment movements for a cylinder of this kind need be arranged outside the bearing, even if the cylinder has no inner throw. Load can be applied and adjustment movements carried out by the combined elements inside the bearing component.

Hydrostatic support for avoiding friction on the crosshead of deflection-controllable cylinders in itself related art per German Patent No. 40 11 364 C2. The aforementioned patent is based on a cylinder having inner throw, in which the crosshead has slide surfaces parallel to the plane of action along which a guide ring, which is supported by a rotatable bearing of the hollow cylinder, can be moved. Hydrostatic bearing pockets are provided to eliminate disruptive friction when the guide ring is moved along the flat slide surfaces. However, the aforementioned patent relates to straight movements within the hollow cylinder rather than to the mounting of the crosshead thereof.

In the case of a cylinder pin supported via spherical surfaces, hydraulically relieving load thereof is generally known from U.S. Pat. No. 5,382,096, including in the case of a combination of spherical surfaces and flat surfaces. However, this patent involves a rotatable bearing for a cylinder pin rather than the static bearing described in the present invention.

The present invention can be implemented in two ways, which differ from one another in terms of design.

In a first of embodiment a plunger/cylinder unit having an axis that applies the support load is provided. A first component of the plunger/cylinder unit is non-movably attached to a given sidewall and the other component of the plunger/cylinder unit moves linearly relative to the first component and can incline relative to the crosshead in its plane of deflection. The two components of the plunger/cylinder unit move linearly relative to one another but cannot be inclined relative to one another. Here, the flexibility relating to the inclination that occurs when the crosshead sags is achieved because the first component of the plunger/cylinder unit rests on the crosshead.

In a second embodiment, one component of the plunger/cylinder unit is rigidly attached to the sidewall, while the other component is rigidly attached to the crosshead and can incline relative to the first component in the plane of deflection. Here the flexibility is achieved within the plunger/cylinder unit, the components of which can be inclined relative to one another thanks to the clearance between them and thanks to seals designed to bridge this clearance.

To avoid tilting moments, the spherical surfaces and the flat slide surfaces should be ring-shaped and should be coaxial with the plunger/cylinder unit.

In the embodiment having spherical surfaces, the plunger/cylinder unit acts on disc-shaped component on whose underside a flat slide surface is formed, and the other flat slide surface is provided on the upper side of disc-shaped cap component, which has a convex spherical surface on its underside. The other concave spherical surface is provided on a disc-shaped bowl component arranged in the bottom-most position.

The present invention teaches a design for the plunger/cylinder unit in which the component having a flat slide surface is the base of cup-shaped cylinder of plunger/cylinder unit. The plunger of plunger/cylinder unit has two separate casings and encloses the wall of the cylinder between its walls, and the pressure chamber inside the wall and above the upper side of the base can be filled with pressure (hydraulic) fluid via a port.

The base of the plunger/cylinder unit and the base of the bowl component form the boundaries of the pressure relief chamber in the axial direction, and the annular seals form its boundaries in the radial direction. The cap component is subject to the pressure of the hydraulic fluid on both sides, and, as the action surfaces match one another, is hydraulically freed of load, i.e. it is load-free. The pressure of the hydraulic fluid tends to raise the base of the plunger/cylinder unit off the bowl component. If no pressure is present in the pressure relief chamber, the components rest on one another via the flat slide surfaces that are provided radially outside the chamber and via the spherical surfaces. If pressure is present in the pressure relief chamber, both pairs of surfaces are hydraulically freed of load, i.e. the load of the plunger/cylinder unit is carried away via the hydraulic fluid.

If the annular seals have roughly the same diameter, the cap component also cannot be kept essentially completely load-free.

It is useful to provide, outside the annular seals, overflow oil collection pockets which collect the overflow oil that leaks radially outwards from the pressure relief chamber at the annular seals. Specifically, these can be arranged so that the overflow collection pocket of the side surfaces is arranged on the component and the overflow collection pocket of the spherical surfaces is arranged on the bowl component.

According to one useful design, the annular seals of the pressure relief chamber form one boundary of the overflow oil collection pockets, and additional annular seals concentric with the aforementioned annular seals form the other boundary.

According to another aspect of the invention, the fluid may be drained off from the overflow collection pockets via holes which lead to an overflow collection chamber connected to an extraction device. This arrangement has the additional advantage that the overflow oil of the plunger/cylinder unit, which is also subject to considerable pressure, can also collect in the overflow oil collection chamber and can be drained off along with the other overflow oil.

It is useful to press the components of the pressure relief chamber together via spring pressure, so as to ensure an initial seal.

In the case of the embodiment in which, when the crosshead sags, flexibility is provided in the plunger/cylinder unit itself, the plunger/cylinder unit can be designed such that the components of the plunger/cylinder unit can be inclined relative to one another by a small angle that correspond to the inclination of the ends of the crosshead when deflected. This serves to maintain the seal of the pressure chamber of the plunger/cylinder unit. With regard to the pressure relief chamber, the outer radial boundary is formed by an annular seal. The pressure relief chamber is formed beneath the base of the first component of the plunger/cylinder unit.

In the case of both embodiments, it is useful if the pressure in the pressure relief chamber is removed via the pressure in the pressure compartment via a fluid connection created via a throttle bore. This has the additional advantage that the release pressure automatically matches the load pressure.

BRIEF DESCRIPTION OF THE DRAWINGS

The drawings show two exemplary embodiments of the invention.

DETAILED DESCRIPTION

Figure 1:
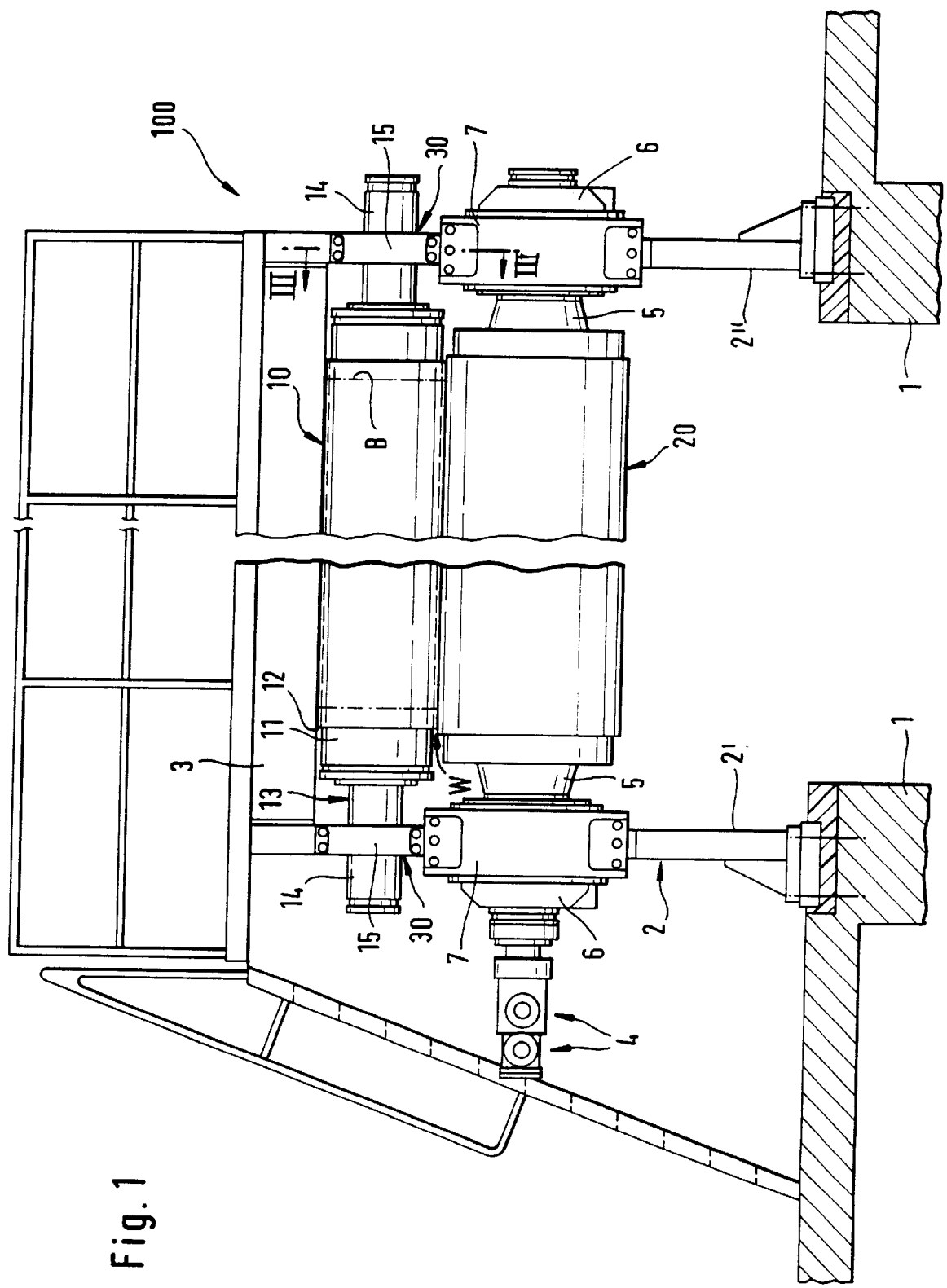
FIG. 1 shows a simplified view of one pair of cylinders of a double calender.

FIG. 1 shows one pair of cylinders 10, 20 of double calender 100 for glazing a continuous paper strip B. Double calender 100 includes a further pair of cylinders of this kind in the opposite arrangement which are arranged directly upstream or downstream of cylinders 10, 20 shown. Double calender 100 is mounted on a base 1 and includes cylinder housing 2 having two sidewalls 2' and 2" which are connected via transverse beam 3 above cylinders 10, 20 so as to form a gantry-type structure.

Cylinders 10, 20 extend between sidewalls 2', 2". Roll 20 has a smooth steel casing and is heated. The ports for heat-bearing liquid conveyed through roll 20 via peripheral holes are designated 4. Pins 5 of roll 20 are supported by bearings 6 mounted in corresponding bearing housings 7 connected to sidewalls 2', 2".

Cylinder 10 is designed as a deflection-controllable cylinder that includes a hollow cylinder 11 having a plastic covering 12. Crosshead 13 longitudinally traverses hollow cylinder 11, clearance being maintained between the crosshead and the entire inner circumference of hollow cylinder 11, and ends 14 of the crosshead protrude axially from the hollow cylinder. Crosshead 13 is non-rotatable and its ends are supported by swivelable outer bearings 30, which, like bearings 6, are mounted in bearing housings 15 connected to sidewalls 2', 2".

A support device, for example a hydraulic device, is arranged on crosshead 13 inside hollow cylinder 11 and acts on its inner circumference, and applies a downward load to the inner circumference of hollow cylinder 11 per FIG. 1, i.e. against cylinder 20. Crosshead 13 sags due to the line force in cylinder gap W, and independently of this the deflection line of the hollow cylinder can follow the deflection line of cylinder 20. The inclination of ends 14 of crosshead 13 that occurs when it sags is absorbed by swivelable bearings 30, so that there is no jamming in side walls 2', 2".

Figure 2:
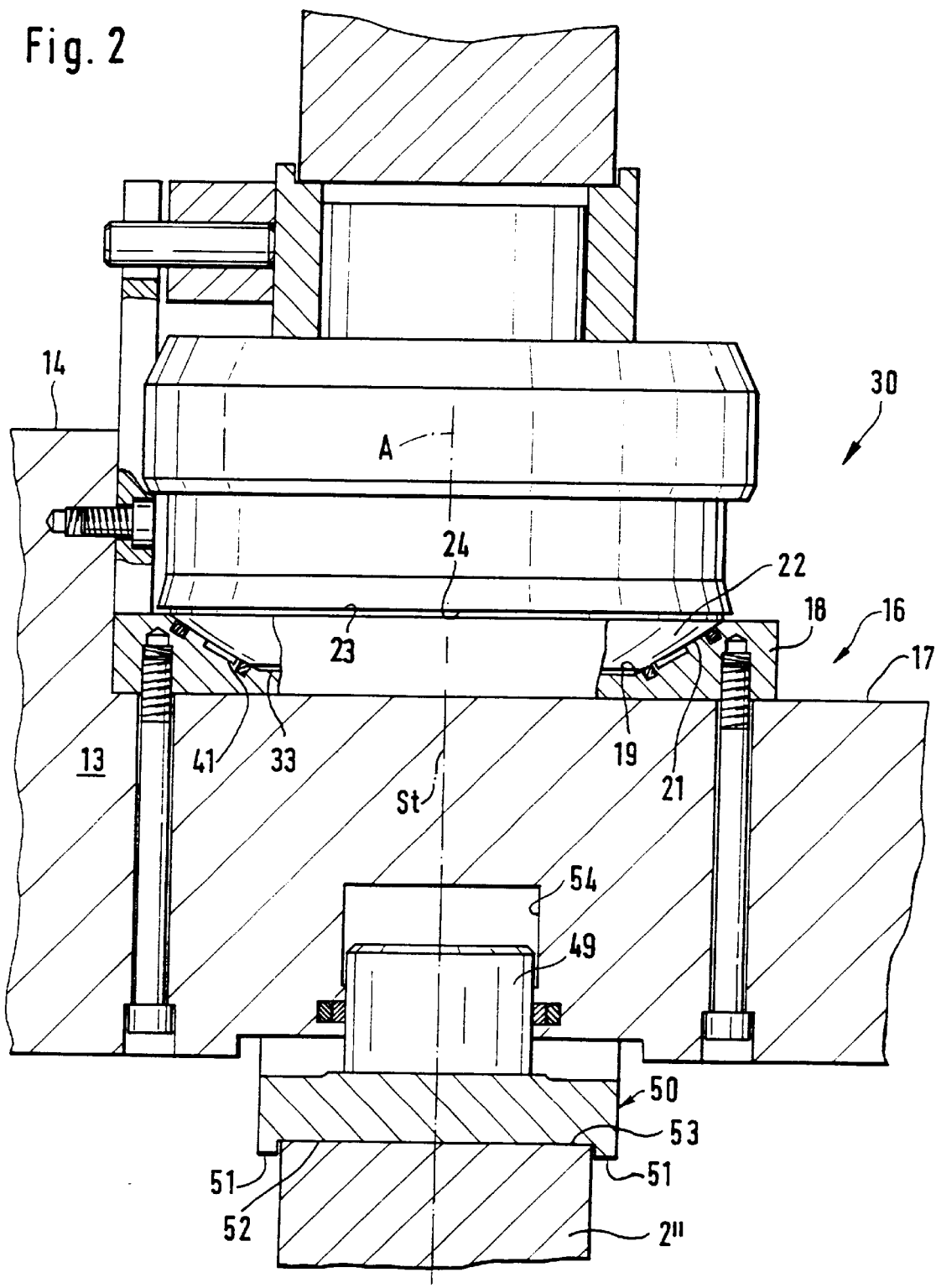
FIG. 2 shows a partial view of a first embodiment of the bearing, partly in the form of a section through the axis of the crosshead.
Figure 3:
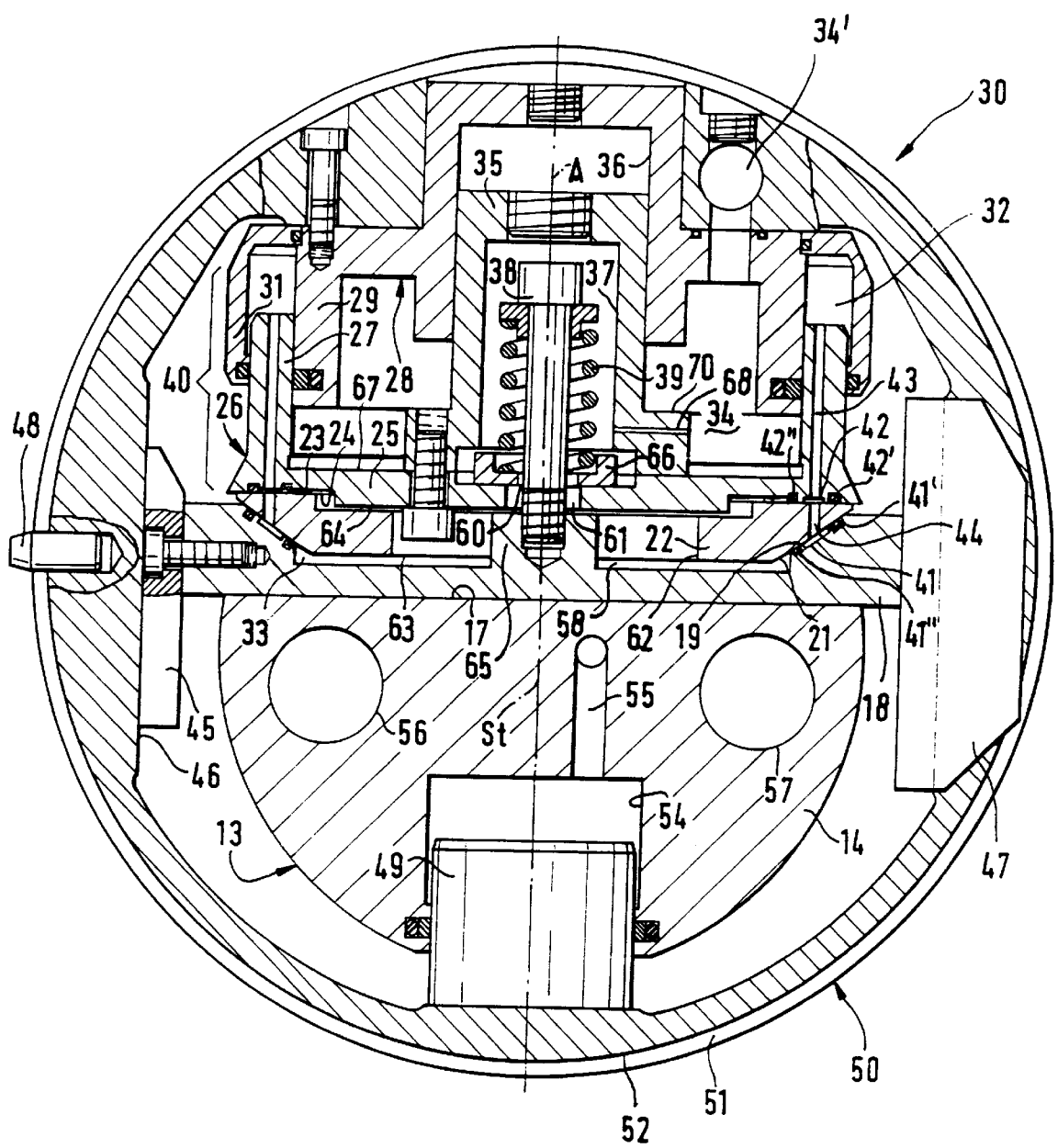
FIG. 3 shows a section perpendicular to the axis of the crosshead through the bearing at one end of the crosshead, per line III—III in FIG. 1.

FIGS. 2 and 3 show the design of the first embodiment of a bearing 30 of this kind in greater detail. FIG. 2 shows right-hand end 14 of cylinder 10 (FIG. 1). End 14 has a shoulder 16 having a flat upper horizontal support surface 17 that is parallel to the axis of crosshead 13. End 14 is offset by about ⅔ of the diameter. A bowl component 18, which as a whole is disc-shaped and has a ring-shaped concave spherical surface 19 which is coaxial with the axis of the ring, its axis A being arranged vertically and, when crosshead 13 is not subject to any load, in support plane St located in the middle of sidewalls 2', 2", is provided on offset support surface 17. Bowl component 18 forms a flat recess 33, the boundary of which is constituted by spherical surface 19. Cap element 22, which is annular disc-shaped, has a central opening 62 through it, and has a convex spherical surface 21 which matches spherical surface 19, is positioned on spherical surface 19. Spherical surfaces 19, 21 swivel relative to one another about the center of the sphere when crosshead 13 sags in the plane of the drawing in FIG. 2 due to the line force in cylinder gap W, which is transferred to crosshead 13 as transverse load by the support device, and end 14 of crosshead 13 becomes inclined from upper left to lower right. The inclination may be very pronounced. In the case of large cylinders, if the crosshead is subjected to full load it may shift 30 mm in the middle from its stretched position.

Flat underside 24 of a disc-shaped component formed by base 25 of cup-shaped cylinder 26, which is shown in greater detail in FIG. 3, rests on flat upper surface 23 of cap component 22, cylindrical wall 27 of the cap component extending upwards per FIG. 3. Flat surfaces 23, 24 form sliding surfaces along which crosshead 13 can move longitudinally relative to sidewalls 2', 2", i.e. in the horizontal direction in FIG. 2, if crosshead 13 is subject to thermal-related elongation, e.g. if cylinder 10 is heated or undergoes an increase in temperature during operation.

Cup-shaped cylinder 26 is part of plunger/cylinder unit 40 (FIG. 3), which includes a plunger 28 having two separate casings, the outside of the plunger's inner plunger wall 29 interacting with the inner circumference of cylindrical wall 27 of cylinder 26 to form a seal, and the plunger also having wall 31, this being coaxial with and radially separated from inner wall 29 and interacting with the outside of wall 27 to form a seal. An overflow oil collection chamber 32, which is connected to an extraction device (not shown), is formed between walls 29, 31 and above the upper face of wall 27.

Components 26, 28 of plunger/cylinder unit 40 move linearly relative to one another, i.e. they can move along axis A but cannot be inclined relative to one another. Interacting spherical surfaces 19, 21 absorb the inclination of ends 14 of crosshead 13 when the crosshead sags.

Plunger 28 is additionally guided within cylinder 26 via a plunger-type guide-pin 35 which has a cylindrical exterior, points upwards from base 25 of cylinder 26, and slides into a corresponding hole 36 in plunger 28. Screw 38 is provided in inner hollow space 37 of guide pin 35, attaches to a central attachment point 65 protruding from the flat base of bowl component 18, and, via screw pressure spring 39, which rests on base 25 of cylinder 26 via pressure disc 66, pulls components 25, 22 and 18 together with a load corresponding to the screw pressure load so as to ensure an initial seal.

An overflow oil collection pocket 41 in the form of a flat circumferential annular groove is provided in spherical surface 19 of bowl component 18 of bearing 30, circumferential sealing rings 41', 41" forming the pocket's seals in the radially outward and inward directions.

In addition to downward-pointing convex spherical surface 21 shown in FIGS. 2 and 3, flat slide surface 23 is provided on the upper side of cap component 22 and interacts with flat slide surface 24 on the underside of base 25. An overflow oil collection pocket 42 in the form of a flat annular groove that is concentric with axis A of plunger/cylinder unit 40 is also provided in slide surface 24, circumferential sealing rings 42', 42" forming the pocket's seals in the radially outward and inward directions. Overflow oil collection pockets 41, 42 are located above one another at roughly the same radial distance from axis A.

Connection bores 44, which are distributed around the circumference of cap component 22, lead to overflow oil collection pocket 41, their other end opening into the cross-sectional area of overflow oil collection pocket 42. Connection bores 43 in wall 27 of cylinder 26 extend parallel to axis A. Overflow oil that collects in overflow oil collection pockets 41, 42, is continuously drained off via connection bores 43, 44 and overflow oil collection chamber 32, so that no pressure builds up.

Plunger/cylinder unit 40 having cap component 22 and bowl component 18 is arranged inside a ring-shaped bearing element 50, which is arranged in a recess 53 of sidewall 2', 2" of cylinder housing 2 that matches its outer circumference 52 (FIG. 2), and is held in place axially in sidewall 2', 2" by radial flanges 51, 51 that rest on the side surfaces of sidewall 2', 2".

Plunger 28 of plunger/cylinder unit 40 is non-movably attached to ring-shaped bearing element 50, whereas cylinder 26 can move in the direction of axis A and is guided perpendicularly relative to axis A on ring-shaped bearing element 50 via slide parts 45, which interact with slide surfaces 46 on the inner circumference of ring-shaped bearing element 50. Movement in the direction of axis of the crosshead is guided via slide plates 47, one of which is shown on the right-hand side of FIG. 3. Peg 48 keeps ring-shaped bearing element 50 from rotating in opening 53 of sidewall 2', 2".

Cylinder 10 of the exemplary embodiment includes a hollow cylinder 11 which is mounted on crosshead 13 via a bearing (not shown) and is thus not a cylinder having inner throw. It therefore requires a device for shifting crosshead 13 in the plane of action, and in this case this is constituted by plunger/cylinder unit 40. A further smaller plunger 49 is provided on the inner circumference of ring-shaped bearing element 50 and protrudes into cylindrical hole 54 on the side of end 14 of crosshead 13 opposite to plunger/cylinder unit 40. The plunger/cylinder unit thus formed is supplied with hydraulic fluid via line 55 inside crosshead 13 and provides lifting movements to lift cylinder 10 off heated cylinder 20.

Channels 56, 57 in end 14 of crosshead 13 are used to supply fluid to the hydraulic support device inside cylinder 10 having one or a plurality of hydraulic chambers that are open toward the inner circumference of hollow cylinder 11, or having support shoes in contact with the inner circumference, or having a series of support plungers having hydrostatic bearing pockets arranged along the cylinder, or similar devices.

If the support device is actuated so as to press hollow cylinder 11 per FIG. 1 downwards against opposite cylinder 20, crosshead 13 would be shifted upwards were it not for bearings 30 per FIG. 2. However, bearings 30, which act at ends 14 of crosshead 13, hold down ends 14, which causes crosshead 13 to sag. The downward directed forces act on offset support surface 17. These forces are generated when a downward force is applied hydraulically to bowl component 18, which rests on support surface 17.

The hydraulic fluid required for this is supplied via 34'and enters chamber 34, where it applies the aforementioned force to upper side 67 of base 25 and outer shoulder 70 of guide-pin 35 connected to base 25. This force is quite considerable and is equal to half of the total force applied in the cylinder gap. The load is transferred to support surface 17 via slide surfaces 23, 24 and spherical surfaces 19, 21. Unless special measures are taken, these surface pairs are subject to considerable load, accompanied by friction that limits mobility. For this reason, surface pairs 23, 24 and 19, 21 are hydraulically relieved of load so that mobility is preserved despite the substantial load.

Some of the hydraulic fluid enters inner chamber 37, containing screw 38 and spring 39, of guide-pin 35 via throttle bore 68, whose cross section is small, and from there passes through recesses 60, 61 to underside 64 of base 25 or into flat recess 33 which forms the lower boundary of release pressure chamber 58. Underside 64 of base 25 leaves a narrow gap between itself and upper side 23 of cap component 22, so that the pressure fluid can spread to annular seal 42" and apply its force to a corresponding circular area minus the cross section of screw 38.

The hydraulic fluid also passes through central opening 62 of cap component 22 to underside 63 thereof. It applies a force which raises cap component 20 off bowl component 18 over a specific circular area defined by annular seal 41" minus the cross section of central pin 65. The areas on the upper side and underside 63 of cap component 22 on which the hydraulic fluid acts are roughly equal, as annular seals 41" and 42" have roughly the same radius. Thus cap component 22 itself is essentially hydraulically relieved of load.

Pressure relief chamber 58 contains cap component 22, and its axial boundaries are formed by the underside of base 25 of plunger/cylinder unit 40 and the base of flat recess 33 of bowl component 18, while its radial boundaries are formed by annular seals 41" and 42". The pressure present in this chamber is used to transfer the force of plunger/ cylinder unit 40 to bowl component 18 and support surface 17 of crosshead 13. Only a small proportion of the force of plunger/cylinder unit 40 needs to act in the area of flat slide surfaces 23, 24 and spherical surfaces 19, 21 to provide a sealing force proportional to the pressure in pressure chamber 34. Basic sealing force is already provided by spring 39.

If for any reason the pressure in release pressure chamber 58 causes lifting between slide surface pair 23, 24 or spherical surface pair 19, 21, hydraulic fluid overflows into oil overflow collection pockets 41 and 42 at annular seals 41". The pressure in release pressure chamber 58 then immediately drops, because significant quantities of pressure fluid from pressure chamber 34 cannot immediately be supplied, due to throttle bore 68. As a result, the gap that has opened up between slide surfaces 23, 24 or spherical surfaces 19, 21 immediately closes, and the pressure in release pressure chamber 58 can increase again. As a result an equilibrium is achieved in which a small quantity of hydraulic fluid flows out constantly and a load-bearing liquid film is formed on spherical surfaces 19, 21, so that adjacent components 25, 22, 18 sit close to one another without direct metal to metal contact, so that mutual shifting can take place with a minimum of friction.

Figure 4:
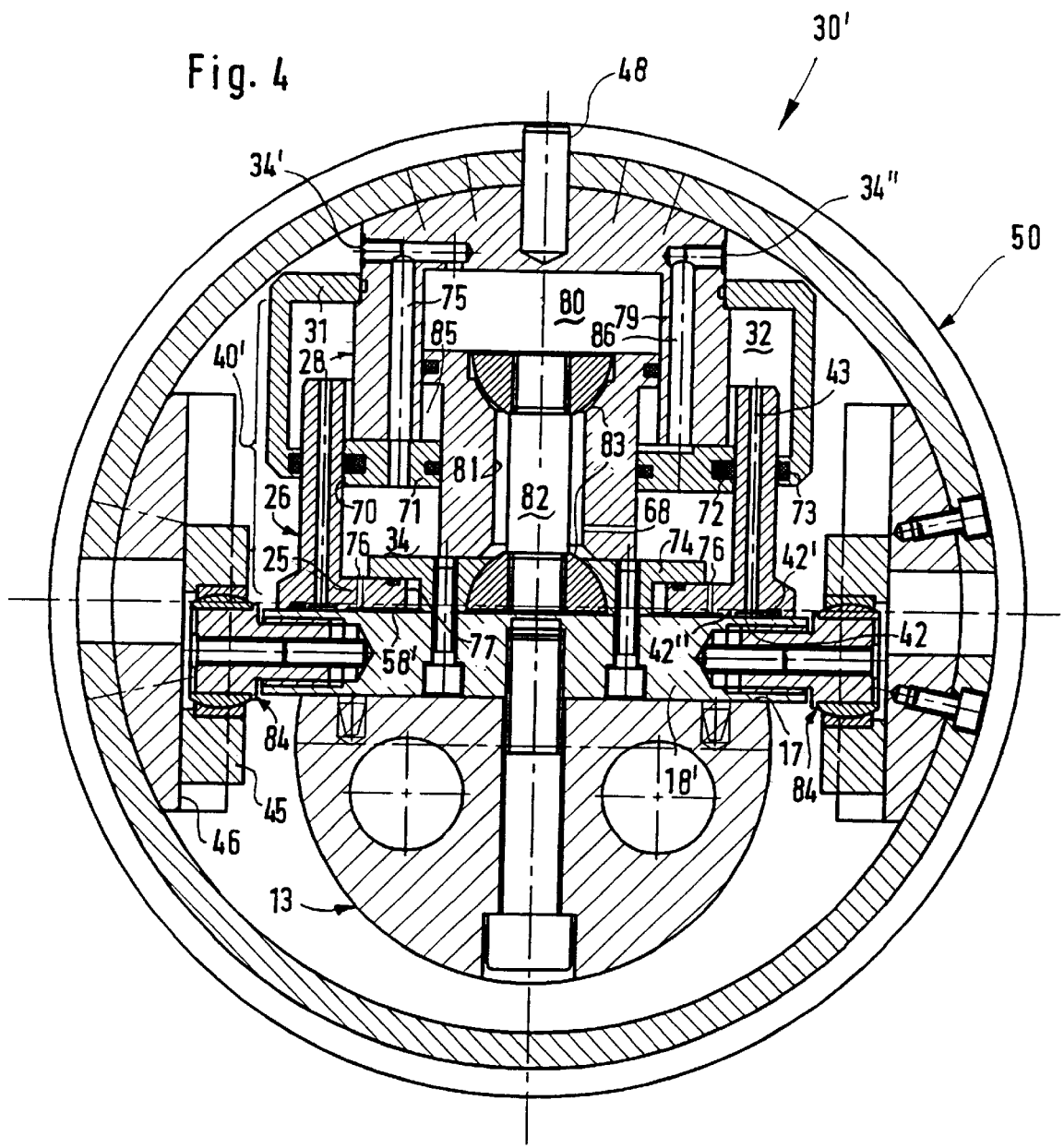
FIG. 4 shows the same section as FIG. 3 through the second embodiment of the bearing at the other end of the crosshead, per line IV—IV in FIG. 5.
Figure 5:
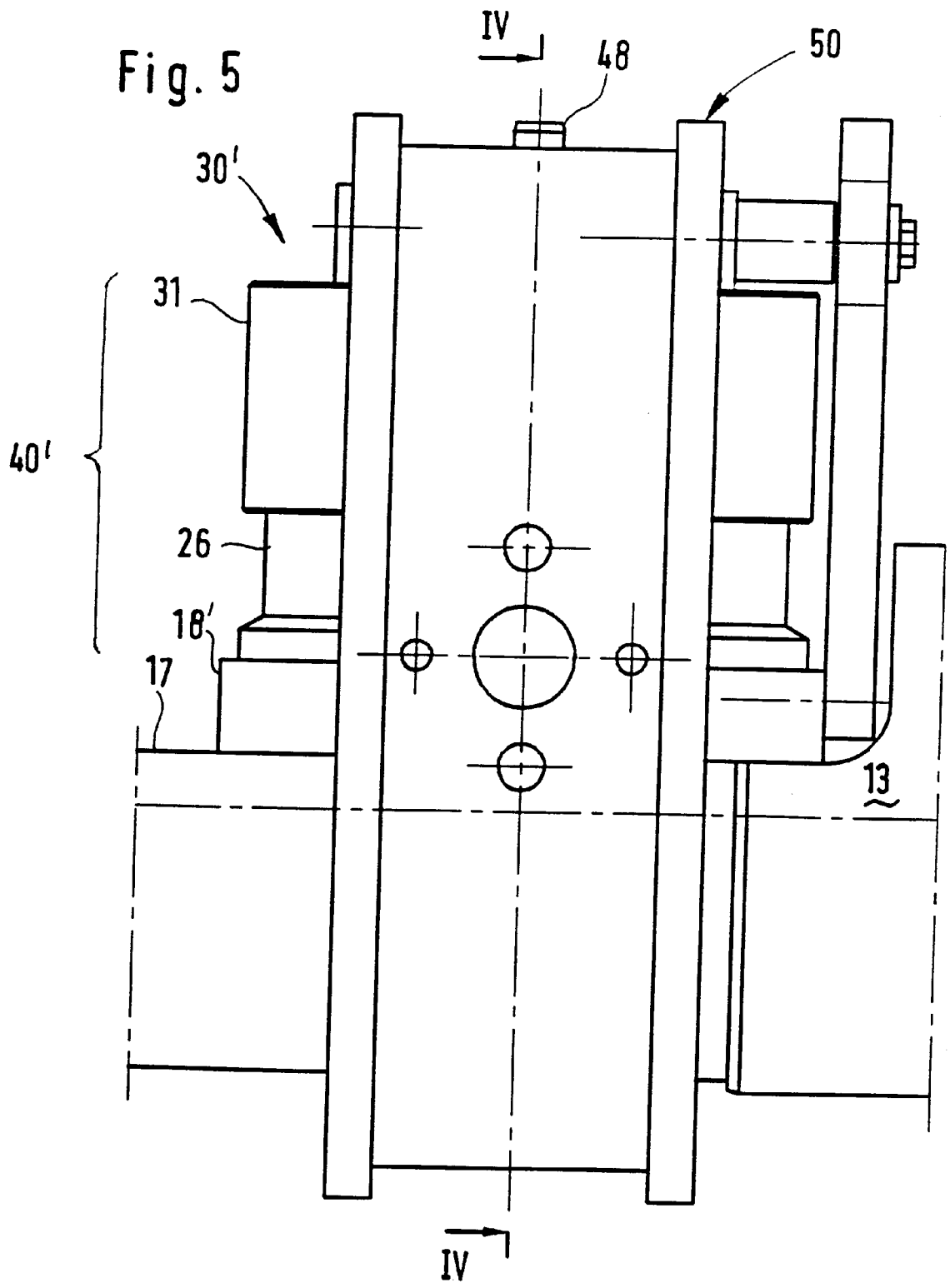
FIG. 5 shows a partial view of this embodiment that corresponds to FIG. 2.

In the case of the second embodiment 30' of the bearing per FIGS. 4 and 5, we have used the same reference numbers to designate components having the same function, and the reference numbers are primed if necessary to allow one to distinguish between the components. To this extent the description of FIGS. 1 to 3 also applies to FIGS. 4 and 5.

The basic difference is that there is no cap component 22 which, in the embodiment shown in FIG. 3, allowed the ends of crosshead 13 to be inclined relative to ring-shaped bearing element 50. In the aforementioned embodiment, the two components 26, 28 of plunger/cylinder unit 40 were connected rigidly, i.e. they were only able to shift relative to one another, but could not be inclined relative to one another.

In the case of bearing 30' shown in FIGS. 4 and 5, inclinability is an integral part of plunger/cylinder unit 40', i.e. second component 28 of plunger/cylinder unit 40' may be inclined by the required small angle relative to first component 26 that constitutes the cylinder because the two components 26, 28 are not guided relative to one another in a strictly straight line but rather are designed so that a certain amount of wobble is permitted. Outer circumference 70 of sliding plunger base 71, which slides up and down the inner circumference of first component 26 that constitutes the cylinder of plunger/cylinder unit 40', is slightly rounded in a plane through axis A, and seals 72, 73 can perform their function even when components 26, 28 are slightly inclined relative to one another as described above.

The pressure fluid enters at 34' and passes through hole 75 in the wall of the component of plunger/cylinder unit 40' that constitutes plunger 28 into the unit's pressure chamber 34 and from there passes through holes 76 in the base of the component of plunger/cylinder unit 40' that constitutes cylinder 26 into pressure relief chamber 58' beneath this base, the pressure relief chamber being circular disc-shaped and extending to annular seal 42" formed by an annular flange on the underside of base 25 of component 26, this annular seal being surrounded by a further annular seal 42', just as in the embodiment shown in FIG. 3, and the two seals 42', 42" form the boundaries of an overflow oil chamber 43 from which the overflow oil that overflows at flange seal 42Δ passes through connection bores 43 into an overflow oil chamber 32, from which it is extracted (method not shown).

Therefore the flat underside of component 26 can, thanks to the pressure compensation chamber 58' formed there, shift fairly easily on the flat upper side of plate component 18', which corresponds to bowl component 18 in FIG. 3, so as to compensate for the thermal-related changes in the length of crosshead 13.

Base 25 of component 26 that constitutes the cylinder has a central opening 77 through which a hold-down disc 74 protrudes, clearance being maintained between it and the opening, and the edge of the hold-down disc extends beyond the edge of opening 77, and the hold-down disc holds down component 26 against plate component 18', thereby providing the initial seal of pressure relief chamber 58'. An additional plunger 78 is provided on the upper side of hold-down disc 74, this plunger protruding through plunger base 71 and sliding up and down within cylinder 79 which is provided in second component 28 that constitutes the plunger of plunger/cylinder unit 40. The plunger surface of additional plunger 78 can be used in this way to apply an additional force, as cylinder chamber 80 above additional plunger 78 is connected to pressure chamber 34 via transverse hole 68 in additional plunger 78. The hydraulic fluid can pass from hole 81 in additional plunger 78 into cylinder chamber 80. Tie rod 82 protrudes through hole 81, clearance being maintained between them, and engages with additional plunger 78 and hold-down disc 74 via spherical surfaces, thus pulling the components together. This ensures that additional plunger 78 is not subject to jamming when crosshead 13 sags. Spherical surfaces 83 on the ends of tie rod 82 have small channels through which the hydraulic liquid can pass from hole 81 into cylinder chamber 80.

Another difference relative to the embodiment shown in FIG. 3 is that slide components 25 which move up and down flat slide surfaces 46 are not attached rigidly to plate component 18 via screws, but rather are inclinable relative to plate component 18' via spherical heads 83. In the case of bearing 30', in order to lift hollow cylinder 11 of cylinder 10 off opposite cylinder 20 a cylinder chamber 85 is formed "below" additional plunger 78 and can be supplied with pressure fluid via hole 86 in the wall of component 28, the hole being parallel to the axis, and via port 34". If pressure is applied to cylinder chamber 85, crosshead 13 is lifted relative to bearing element 50 in sidewalls 2 or 2" and cylinder 10 is thus lifted off cylinder 20.

What is claimed is:

1. A rolling contact cylinder device for subjecting webs to a pressure treatment, comprising:

a deflection-controllable cylinder;

a hollow cylinder having an inner peripheral surface, the hollow cylinder located within the deflection-controllable cylinder, the hollow cylinder rotating around an axis and forming a working cylinder circumference;

a non-rotatable crosshead having ends and a length, the crosshead traverses the hollow cylinder, clearance being maintained between the crosshead around an inner peripheral surface of the hollow cylinder;

an inner support device which is mounted on the crosshead and which acts on the inner peripheral surface of the hollow cylinder, the inner support device having outer bearings which support the ends of the crosshead at outer sidewalls, each of the outer bearings have cooperating spherical surfaces for absorbing a deflection of the crosshead, one of the spherical surfaces is attached to the crosshead and another of the spherical surfaces is attached to one of the sidewall cooperating spherical surfaces are combined within a ring-shaped bearing element arranged in a plane that is perpendicular to an axis of the crosshead and the bearing element is arranged in an opening in one of the sidewalls, wherein one of the ends crosshead extends through the ring-shaped bearing element, the crosshead has a shoulder in the area of the bearing element that supports as a single constructional unit components of bearing; and an arrangement of flat slide surfaces that are hydrostatically relieved of load to compensate for thermal-related changes in the length of the crosshead, one of the flat slide surfaces is joined to the crosshead and another of the flat slide surfaces is joined to one of the sidewalls, wherein the spherical surfaces and the flat slide surfaces are at least to some extent hydraulically relieved of load.

2. A cylinder device according to claim 1, comprising:

a plunger/cylinder unit having an axis(A) that applies support load, a first component of the plunger/cylinder unit being rigidly attached to one of the sidewalls, while a second component of the plunger/cylinder unit is rigidly attached to the crosshead and can incline relative to the first component in a plane of deflection of the crosshead.

3. A cylinder device according to claim 2, wherein the first component and the second component of the plunger/cylinder unit can be inclined relative to one another by a small angle that corresponds to an inclination of the ends of the crosshead when subjected to transverse bending, so that a seal of the pressure chamber of the plunger/cylinder unit is maintained.

4. A cylinder device according to claim 3, wherein a pressure relief chamber, an outer radial boundary of which is formed by an annular seal, is formed beneath a base of the first component of the plunger/cylinder unit.

5. A cylinder device according to claim 1, further comprising a plunger/cylinder unit having an axis (A) that applies support load, a first component of the plunger/cylinder unit being non-movably attached to one of the sidewalls and another component of the plunger/cylinder unit being able to move linearly relative to the first component so that it can incline relative to a plane of deflection of the crosshead.

6. A cylinder device according to claim 5, wherein the plunger/cylinder unit acts on a disc-shaped component, one of the flat slide surfaces is provided on an underside of the disc-shaped component, and another of the flat slide surfaces is provided on an upper side of a disc-shaped cap component, the disc-shaped cap component having an underside, the underside of the cap having one of the spherical surfaces, the spherical surface of the cap being convex, and a disc-shaped bowl arranged in a bottommost position, the disk shaped bowl having an underside, the underside of the bowl having one of the spherical surfaces, the spherical surface of the bowl being concave.

7. A cylinder device according to claim 5, wherein the spherical surfaces and the flat slide surfaces are ring-shaped and share the axis (A).

8. A cylinder device according to claim 7, wherein the pressure chamber of the plunger/cylinder unit is hydraulically connected to the pressure relief chamber via at least one throttle bore.

9. A cylinder device according to claim 7, wherein the plunger/cylinder unit acts on a disc-shaped component, one of the flat slide surfaces is provided on an underside of the disc-shaped component, and another of the flat slide surfaces is provided on an upper side of a disc-shaped cap component, the disc-shaped cap component having an underside, the underside of the cap having one of the spherical surfaces, the spherical surface of the cap being convex, and a disc-shaped bowl arranged in a bottommost position, the disk shaped bowl having an underside, the underside of the bowl having one of the spherical surfaces, the spherical surface of the bowl being concave.

10. A cylinder device according to claim 9, wherein the disc-shaped component is a base of a cup-shaped cylinder of the plunger/cylinder unit, a plunger of the plunger/cylinder unit has two separate casings and the plunger encloses a wall of the cylinder between a wall of the plunger, the cylinder device further comprising a pressure chamber inside a wall of the plunger and above an upper side of the base that can be filled with hydraulic fluid via a port.

11. A cylinder device according to claim 10, wherein a pressure relief chamber is formed beneath a base in the bowl component, the pressure relief chamber at least partially contains the cap component, the chamber having outer boundaries formed by an annular seal on the flat slide surfaces and an annular seal on the spherical surfaces, and in which chamber a hydraulic fluid has access to face areas of the cap component located within the annular seal of the flat slide surfaces and the annular seal of the spherical surfaces.

12. A cylinder device according to claim 11, wherein overflow collection pockets for leakage oil are formed radially outside the annular seal of the flat slide surfaces and the annular seal of the spherical surfaces.

13. A cylinder device according to claim 11, wherein the boundaries of the pressure relief chamber are subject to a load imparted by the resilient action of a spring.

14. A cylinder device according to claim 11, wherein the annular seal of the flat slide surfaces and the annular seal of the spherical surfaces have roughly a same diameter.

15. A cylinder device according to claim 14, wherein overflow collection pockets for leakage oil are formed radially outside the annular seal of the flat slide surfaces and the annular seal of the spherical surfaces.

16. A cylinder device according to claim 15, wherein boundaries of the overflow collection pockets are formed by the annular seal of the flat slide surfaces and the annular seal of the spherical surfaces, by annular seals which are radially at a distance therefrom and are concentric therewith, and by slide the surfaces.

17. A cylinder device according to claim 15, wherein boundaries of the overflow collection pockets are formed by the annular seal of the flat slide surfaces and the annular seal of the spherical surfaces, by annular seals which are radially at a distance therefrom and are concentric therewith, and by the spherical surfaces.

18. A cylinder device according to claim 15, wherein the leakage oil is drawn off from the overflow collection pockets via at least one connection through a bore leading through the wall of the cylinder in a direction of action of the plunger/cylinder unit.

19. A cylinder device according to claim 15, wherein the overflow collection pockets for leakage oil comprise:

an overflow collection pocket of slide surfaces arranged on the cap component; and an overflow collection pocket of spherical surfaces arranged on the bowl component.

20. A cylinder device according to claim 19, wherein the leakage oil is drawn off from the overflow collection pockets via at least one connection through a bore leading through the wall of the cylinder in a direction of action of the plunger/cylinder unit.

21. A cylinder device for pressure processing a continuous material strip comprising:
- a deflection-controllable cylinder having a hollow cylinder configured to rotate around the axis of the deflection-controllable cylinder, the hollow cylinder forming the working cylinder circumference;
- a non-rotatable crosshead that traverses the hollow cylinder, clearance maintained between the crosshead and an entire inner circumference of the hollow cylinder, the crosshead having ends;
- an inner support device mounted on the crosshead configured to act on the inner circumference of the hollow cylinder;
- jointly acting spherical surfaces configured to support the ends of the crosshead at the outer sidewalls, one of the spherical surfaces connected to the crosshead, another of the spherical surfaces connected to the outer sidewalls, so as to absorb the deflection of outer bearings supporting the crosshead; wherein
- the spherical surfaces of the outer bearings are hydraulically relieved of the forces exerted on the cylinder by a continuous material strip.

22. A support for one end of a crosshead of a deflection-controllable cylinder for pressure processing a continuous material strip comprising:
- a deflection-controllable cylinder having a hollow cylinder configured to rotate around the axis of the deflection-controllable cylinder, the hollow cylinder forming a working cylinder circumference;
- a non-rotatable crosshead that traverses the hollow cylinder, clearance maintained between the crosshead and an entire inner circumference of the hollow cylinder, the crosshead having an inner support device mounted on the crosshead, the support device configured to act on the inner circumference of the hollow cylinder, the crosshead having ends;
- jointly acting spherical surfaces configured to support the ends of the crosshead at the outer sidewalls, one of the spherical surfaces connected to the crosshead, another of the spherical surfaces is connected to the outer sidewalls, so as to absorb the deflection of outer bearings supporting the crosshead; wherein
- the spherical surfaces of the outer bearings are hydraulically relieved of forces exerted on the cylinder by a continuous material strip.

* * * * *

UNITED STATES PATENT AND TRADEMARK OFFICE
CERTIFICATE OF CORRECTION

PATENT NO. : 6,344,019 B1
DATED : February 5, 2002
INVENTOR(S) : Karl-Heinz Kusters It is certified that error appears in the above-identified patent and that said Letters Patent is hereby corrected as shown below:

Column 10,
Line 67, delete "sidewall" and insert therefore -- sidewalls, the --.

Signed and Sealed this

Twenty-sixth Day of November, 2002

Attest:

Attesting Officer

JAMES E. ROGAN
Director of the United States Patent and Trademark Office